No. 829,343. PATENTED AUG. 21, 1906.
T. KRANZ.
APPLIANCE FOR PREVENTING WIND SUCKING IN HORSES AND CATTLE.
APPLICATION FILED APR. 7, 1905.
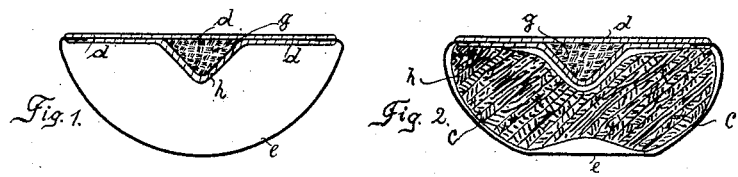
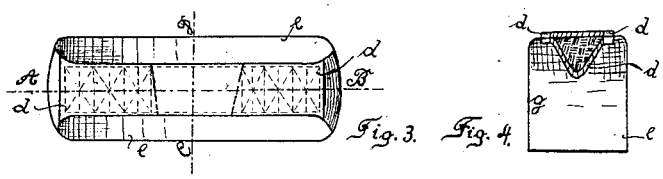
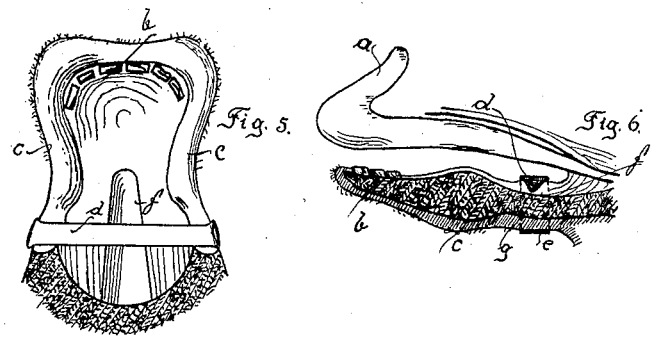
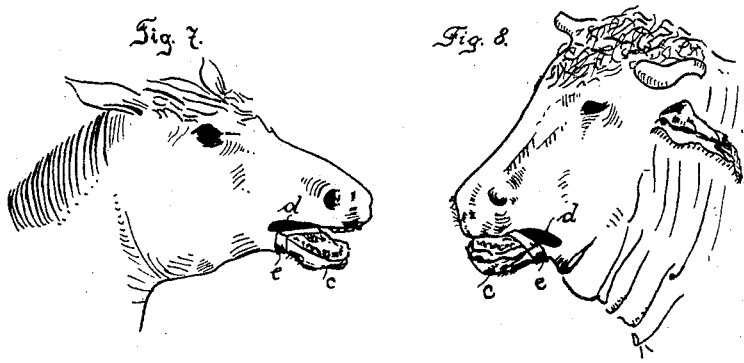

UNITED STATES PATENT OFFICE.

THOMAS KRANZ, OF STEINDORF, GERMANY, ASSIGNOR TO FRANZ RETTENBERGER AND JOSEF SIGL, OF STARNBERG, GERMANY.

APPLIANCE FOR PREVENTING WIND-SUCKING IN HORSES AND CATTLE.

No. 829,343.

Specification of Letters Patent.

Patented Aug. 21, 1906.

Application filed April 7, 1905. Serial No. 254,413.

*To all whom it may concern:*

Be it known that I, THOMAS KRANZ, a subject of the German Emperor, residing at Steindorf, near Bruck, Bavaria, Empire of Germany, have invented certain new and useful Improvements in Appliances for Preventing Wind-Sucking in Horses and Cattle, of which the following is a clear, full, and exact specification.
The object of the present invention is to cure "wind-sucking" in horses and cattle, which causes the stomach to be filled with air and distended, thereby causing dangerous colics or flatulence.
The invention consists in preventing the animal from effecting the movements of the tongue that produce the wind-sucking action by the insertion in the lower jaw of the animal behind the front teeth and under the tongue a band, the part within the jaw of which is rigid and is held in position by an elastic part passing underneath the jaw.

The accompanying drawings show the construction of the said appliance and the mode in which it is applied to the animal.

Figure 1 shows a section on the line A B of the appliance detached. Fig. 2 shows a cross-section through the animal's jaw with the appliance in position. Fig. 3 shows a plan view of the appliance. Fig. 4 shows a cross-section of the appliance on line C D in Fig. 3. Fig. 5 shows a plan view of the animal's jaw with the appliance in position. Fig. 6 shows a longitudinal section of the jaw with the appliance in position, and Figs. 7 and 8 show heads of animals with the appliance in position.

The appliance consists of a rigid part $d$, on the under side $h$ of which is a pad $g$ formed so as to project loosely into the hollow $f$ of the jaw, as shown at Fig. 2. This pad may, however, in some cases be omitted. To each end of the part $d$ are attached the ends of an elastic band $e$, which passes round the under side of the jaw $c$, while the part $d$ passes across the top of the jaw, underneath the tongue $a$, behind the teeth $b$.

The application of the band, which in no way inconveniences the animal, is effected in an easy and simple manner. It forms no hindrance to biting or chewing, nor does it prevent the neighing or bellowing, as it does not rest completely upon the inner surface of the jaw, but leaves sufficiently large space for the motion of all parts. On the other hand, the appliance, as proved by lengthened experiment, renders it perfectly impossible for the animal to effect the characteristic movements of the tongue which produce the wind-sucking. The tongue is therefore not hindered by the appliance in its necessary movements, but only in its unnecessary and detrimental freedom of motion which produces wind-sucking.

Having thus described my invention, what I claim is—

1. Device for preventing sucking of wind which consists of a stiff strip adapted to be placed under the tongue upon the lower jaw, and of an elastic band, to be placed under the jaw attached to the ends of said stiff strip to hold it in place in the mouth in the rear of the front teeth.

2. Device for preventing sucking of wind which consists of a stiff strip being provided in its middle with a bend corresponding to the curvature of the lower jaw and adapted to be placed under the tongue upon the lower jaw and of an elastic band to be placed under the jaw, attached to the ends of said stiff strip to hold it in place in the mouth in the rear of the front teeth.

In testimony whereof I affix my signature.

THOMAS KRANZ.

In presence of—
   ULYSSES J. BYWATER,
   MATHILDE K. HELD.